(12) United States Patent
Heath, II

(10) Patent No.: US 7,195,368 B2
(45) Date of Patent: Mar. 27, 2007

(54) FISH ATTRACTING APPARATUS AND METHOD

(75) Inventor: Charles L Heath, II, Port St. Lucie, FL (US)

(73) Assignee: Superfishlight, Inc, Port St. Lucie, FL (US)

( * ) Notice: Subject to any disclaimer, the term of this patent is extended or adjusted under 35 U.S.C. 154(b) by 43 days.

(21) Appl. No.: 11/137,902

(22) Filed: May 26, 2005

(65) Prior Publication Data

US 2006/0230667 A1 Oct. 19, 2006

Related U.S. Application Data

(60) Provisional application No. 60/672,162, filed on Apr. 15, 2005.

(51) Int. Cl.
*F21V 33/00* (2006.01)
*A01K 75/02* (2006.01)
*A01K 63/06* (2006.01)

(52) U.S. Cl. .................. 362/101; 362/231; 43/17.5; 119/266

(58) Field of Classification Search ............ 362/101, 362/231; 43/17.5; 119/266, 267
See application file for complete search history.

(56) References Cited

U.S. PATENT DOCUMENTS

| | | | | |
|---|---|---|---|---|
| 3,955,078 A | * | 5/1976 | Eggers et al. | 362/222 |
| 4,553,194 A | * | 11/1985 | Bailey | 362/267 |
| 4,697,374 A | | 10/1987 | Simms | 43/17.5 |
| 5,133,145 A | | 7/1992 | McDonald | 43/17.5 |
| 5,175,951 A | * | 1/1993 | Fruchey | 43/17.6 |
| 5,195,266 A | | 3/1993 | Troescher | 43/17.6 |
| 5,353,746 A | * | 10/1994 | Del Rosario | 119/266 |
| 5,651,209 A | | 7/1997 | Rainey | 43/17.5 |
| 6,203,170 B1 | * | 3/2001 | Patrick et al. | 362/234 |
| 6,732,469 B2 | | 5/2004 | Lindgren | 43/17.5 |

* cited by examiner

*Primary Examiner*—Ali Alavi
(74) *Attorney, Agent, or Firm*—James Ray & Associates

(57) ABSTRACT

An apparatus for attracting fish includes a light source for emitting a green light. The light source is disposed within an enclosure which is removably attached to a rigid structure at a predetermined distance above a water surface and includes a diffuser capable of passing the emitted light therethrough. The light source is electrically connected to a power source capable of supplying 120 volts AC. Control switch disposed intermediate the light source and the power source selectively controls supply and termination of the voltage to the light source. The emitted light penetrates the diffuser and the water surface and is transmitted to a predetermined distance below the surface of water.

16 Claims, 1 Drawing Sheet

US 7,195,368 B2

FISH ATTRACTING APPARATUS AND METHOD

CROSS-REFERENCE TO RELATED APPLICATIONS

This application is related to and claims priority from U.S. Provisional Patent Application Ser. No. 60/672,162 filed on Apr. 15, 2005.

FIELD OF THE INVENTION

The present invention relates, in general, to apparatus for use in attracting fish and, more particularly, this invention relates to an apparatus for and a method of attracting fish which is mounted above the water surface.

BACKGROUND OF THE INVENTION

As is generally well known attracting fish in both sport and leisure fishing continues to be a challenge. Attempts have been made to alleviate the difficulties in attracting fish by using illuminated lures attached to the end of the fishing line or using illuminated devices at least partially submersible into the water. These devices emit a green light which has been observed as being effective in attracting the fish.

Generally, the submersible type devices include a light source emitting green light which is connected by a power cord to a 12 VDC battery or battery charger. The need for having and using such battery has been found undesirable due to its close proximity to the point of use and the need for periodic recharging.

Additionally, the power cord connecting the device with the power source may pose a safety hazard due to tripping as all attention during fishing is focused on casting the line and catching fish.

Accordingly, there is a need for an apparatus for attracting fish that overcomes the several disadvantages of the currently used devices.

SUMMARY OF THE INVENTION

The present invention provides an apparatus for attracting fish which includes a light source capable of emitting green light. The light source is disposed within an enclosure which is removably attached to a rigid structure at a predetermined distance above a surface of the water and includes a diffuser capable of passing the emitted light therethrough. The enclosure meets regulatory requirements for installation in wet or damp environments. The light source includes a pair of fluorescent lamps each electrically connected to a power source capable of supplying 120 volts AC with sockets and a ballast means. A control switch disposed intermediate the light source and the power source selectively controls supply and termination of the voltage to the light source. The emitted light penetrates the diffuser and the surface of water and is transmitted to a predetermined distance below the surface of water. A photo sensor or an adjustable timer may be provided for unattended and automatic operation of the light source. Alternative light sources may include incandescent, light emitting diode or a chemo-luminescent light source.

OBJECTS OF THE INVENTION

It is, therefore, one of the primary objects of the present invention to provide an apparatus for attracting fish.

Another object of the present invention is to provide an apparatus for attracting fish that emits yellow, green or blue light.

Yet another object of the present invention is to provide an apparatus for attracting fish that is removably mounted to a rigid structure above the surface of water.

A further object of the present invention is to provide an apparatus for attracting fish which is removably mounted to a rigid structure above the surface of water that emits light capable of penetrating the surface of water.

An additional object of the present invention is to provide an apparatus for attracting fish which incorporates controls for selectively initiating and terminating operation of such apparatus.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
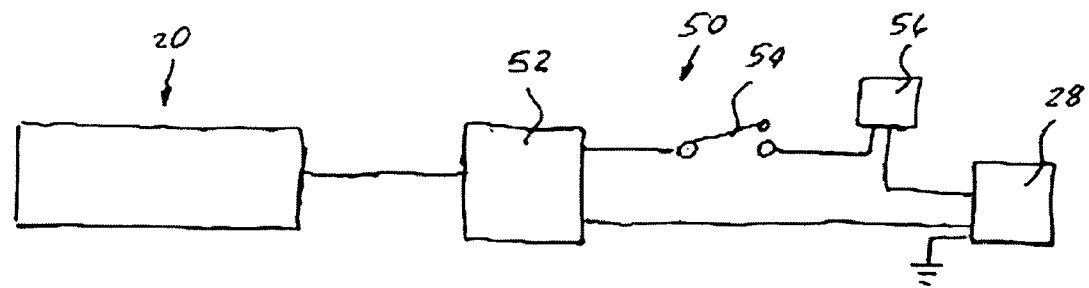
FIG. 1 is a schematic representation of a presently preferred fish attracting apparatus of the invention.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a rigid structure applies to docks, piers, canopies, walls and building structures disposed within or adjacent a body of water and to various types of watercrafts capable of sourcing and supplying electrical power.

Figure 2:
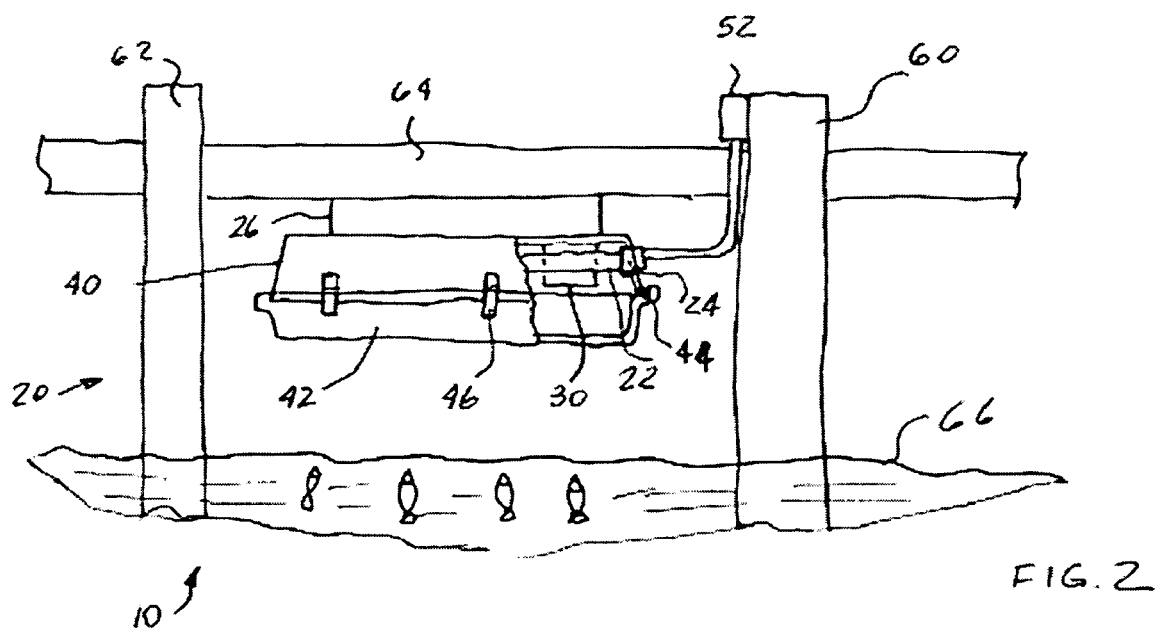
FIG. 2 is a side elevation view of the fish attracting apparatus of the present invention illustrated in FIG. 1, particularly showing a presently preferred embodiment in combination with a dock or a pier.

Reference is now made, to FIGS. 1–2, wherein there is shown an apparatus, generally designated 10, for attracting fish.

Such apparatus 10 comprises a light source, generally designated 20, capable of emitting light having each of a predetermined color, predetermined output, predetermined intensity, and predetermined brightness. The presently preferred predetermined color of such light source 20 is one of a yellow, green, blue and a combination thereof. The light source 20 is electrically connected to a power source 28 supplying a predetermined voltage for enabling the light source 20 to emit the light.

Now, in reference to FIG. 2, the presently preferred construction of the light source 20 is a fluorescent lamp 22 characterized by a predetermined shape, predetermined size and a predetermined light output. Such fluorescent lamp 22 may be a model FT12/G available from General Electric Company of Fairfield, Conn. or its equivalent available from Royal Philips Electronics of the Netherlands. The fluorescent lamp 22 is operable from a power source 28 capable of sourcing 120 AC voltage.

There is a pair of sockets 24, each engaging an end of the fluorescent lamp 22. Each socket 24 is attached to a means 26, such as a well known bracket, provided for direct attachment of the fluorescent lamp 22 to a rigid structure 60 with any well known fasteners. Alternatively, such attachment means 26 may be a flexible, semi-rigid or rigid member 26 including but not limited to cable, rope, chain and rod for suspending such fluorescent lamp 22 from the rigid structure 60 at a predetermined distance above the surface of water.

The sockets 24 are electrically connected to the power source 28 through a well known ballast means 30 and control means, generally designated 50. Such ballast means may be directly attached to the rigid structure 60 or to such mounting means 26.

Preferably, the fluorescent lamp 22, pair of sockets 24 and the ballast means 30 are disposed within an enclosure 40 having a portion 42, such as diffuser 42, capable of passing the emitted light therethrough. In applications requiring substantial protection of the light source 20 from adverse environmental conditions such as water, salt water, corrosion and the like, there is a seal means 44, such as a gasket, disposed intermediate the mating portions of the enclosure 40 and the diffuser 42 with the later secured to the enclosure 40 with a plurality of clamp means 46 or any other fastening means capable of providing waterproof attachment of the diffuser 42 to the enclosure 40. The presently preferred material of the enclosure 40 is fiberglass reinforced polyester. The presently preferred material of the diffuser 42 is acrylic with a stippled interior surface to spread the image of the fluorescent lamp 22 and the light emitted therefrom. Such enclosure 40 and the diffuser 42 can be selected from a DM or DMW series enclosures and diffusers available complying with UL and CSA requirements for wet or damp applications and available from Lithonia Lighting of Conyers, Ga. or they can be custom manufactured according to the UL and CSA requirements for wet or damp applications.

In further reference to FIG. 2, the rigid structure 60 is shown as a dock 60 having vertically disposed pilings 62 and a horizontally disposed deck portion 64. The light source 20 is mounted to a predetermined portion of the deck 64, preferably the under surface thereof, at a first predetermined distance above the water surface 66 enabling the emitted light to penetrate such water surface 66 and be transmitted to a second predetermined distance below the water surface 66.

It has been found, through experimentation, that such first predetermined distance associated with attachment of the light source 20 of the presently preferred embodiment is approximately three feet above the water surface 66 in a high tide condition.

It further has been found, through experimentation, that while one fluorescent lamp 22 is sufficient to attract fish, a second fluorescent lamp 22, adjacently disposed, significantly improves the performance of the light source 20 to attract the fish. Accordingly, a second pair of sockets 22 is provided within the housing 40 for connecting such second lamp 22.

Additionally, it has been observed that the light emitted from the apparatus 10 of the present invention is suitable for decorative accent lighting purposes in the outdoor environment adjacent to the shore line or building structures.

In further reference to FIG. 1, the control system 50 of the presently preferred embodiment includes an outlet 52 connected to the ballast means 30 and to the power source 28. Preferably, the outlet 52 is of a ground fault current interrupting (GFCI) type. There is a switch means 54 disposed intermediate the power source 28 and the outlet 52 for selectively providing and terminating supply of the predetermined voltage from the power source 28 to the outlet 52. A means 56 electrically connected intermediate the switch means 56 and the power source 28 may be provided for unattended and automatic control of the outlet 52 and the light source 20. Such automatic control means 56 may be a well known photo cell sensor 56 enabling supply of the predetermined voltage at around sunset and discontinuing supply of such predetermined voltage at around sunrise. Alternatively, such automatic control means 56 may be an adjustable timer 56.

Although the present invention has been shown in terms of the fluorescent light source mounted in the enclosure suitable for wet or damp applications under a dock surface, it will be apparent to those skilled in the art, that the present invention may be applied to other rigid structures such as piers, canopies, walls and building structures disposed within or adjacent a body of water.

It will be understood that the apparatus of the present invention may be at least removably attached to various types of watercrafts and operable from the available power source.

It will be further understood, that alternative lighting sources capable of emitting one of the yellow, green, blue and combination thereof light and penetrating the water surface may be used either in combination with the housing mounted to a rigid structure or adapted for direct attachment. Such alternative lighting sources may include light emitting diodes, incandescent light and chemo-luminescent materials.

Furthermore, those skilled in the art will appreciate that although 120 AC is presently the most commonly available power source, the lighting source and the control means may be selected for operation from any other commonly available power sources such as 12 VDC, 24 VDC, 110 VAC, 220 VAC, 440 VAC and the like.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A method for attracting fish, said method comprising the steps of:
   (a) providing a light source having a predetermined size for emitting light having each of a predetermined output, predetermined color, predetermined intensity, and predetermined brightness;
   (b) removably attaching said light source to a predetermined portion of a rigid structure at a first predetermined distance above a water surface;
   (c) connecting said light source to a power source supplying a predetermined voltage; and
   (d) activating said power source to supply said predetermined voltage to said light source and emit said light, whereby said emitted light penetrates said water surface and is transmitted to a second predetermined distance below said surface of water.

2. The method, according to claim 1, wherein said method further includes a step of encasing said light source in an enclosure having at least a portion thereof enabling passage of said light therethrough.

3. The method, according to claim 1, wherein said method further includes a step of providing a control means connected to said power source and said light source and operable to selectively activate and terminate supply of said predetermined voltage from said power source to said light source.

4. An apparatus for attracting fish, said apparatus comprising:
   (a) a light source having a predetermined size for emitting light having each of predetermined color, predetermined output, predetermined intensity, and predetermined brightness;
   (b) means engageable with said light source for removably attaching said light source to a predetermined portion of a rigid structure at a first predetermined distance above a surface of water; and
   (c) means engageable with said light source for electrically connecting said light source to a power source supplying a predetermined voltage, whereby said supply of said predetermined voltage to said light source enables said light source to emit said light, and whereby said emitted light penetrates said surface of water and is transmitted to a second predetermined distance below said surface of water.

5. The apparatus, according to claim 4, wherein said light source is one of a fluorescent, incandescent, light emitting diode, chemo-luminescent and any combination thereof.

6. The apparatus, according to claim 4, wherein said predetermined color is one of a yellow, green, blue and any combination thereof.

7. The apparatus, according to claim 4, wherein said light source is disposed within an enclosure having at least a portion thereof passing said emitted light therethrough, said enclosure meeting regulatory requirements for installation in one of a wet environment, damp environment and combinations thereof.

8. The apparatus, according to claim 4, wherein said apparatus further includes control means disposed intermediate and electrically connected to said light source and said power source for selectively activating and terminating said supply of said predetermined voltage from said power source to said light source.

9. The apparatus, according to claim 8, wherein said control means is an electrical switch operable between a first position to activate said supply of said predetermined voltage and a second position to terminate said supply of said predetermined voltage.

10. The apparatus, according to claim 8, wherein said control means further includes means for unattended and automatic operation of said light source.

11. The apparatus, according to claim 10, wherein said automatic control means is one of a photo sensor, adjustable timer and a combination thereof.

12. The apparatus, according to claim 4, wherein said attachment means is one of a rigid, semi-rigid, flexible and any combination thereof.

13. An apparatus for attracting fish, said apparatus comprising:
   (a) an enclosure meeting regulatory requirements for installation in one of a wet environment, damp environment and combination thereof;
   (b) means engageable with said enclosure for removably attaching said enclosure to a predetermined portion of a rigid structure at a first predetermined distance above surface of water;
   (c) a pair of light sources having a predetermined size and mounted within said enclosure for emitting light having each of a predetermined color, predetermined output, predetermined intensity, and predetermined brightness; and
   (d) means engageable with said light source and with said enclosure for electrically connecting said light source to a power source supplying a predetermined voltage to said light source, whereby said supply of said predetermined voltage to said light source enables it to emit said light, and whereby said emitted light passes through at least a portion of said enclosure, penetrates said surface of water and is transmitted to a second predetermined distance below said surface of water.

14. The apparatus, according to claim 13, wherein said predetermined voltage is 120 volts AC.

15. The apparatus, according to claim 13, wherein said predetermined color of said light is green.

16. The apparatus, according to claim 13, wherein said electrical connection means includes:
   (a) a first pair of sockets each engaging radially opposed ends of a first one of said pair of light sources;
   (b) a second pair of sockets each engaging radially opposed ends of a second one of said pair of light sources;
   (c) a ballast means electrically connected to each one of said first pair and said second pair of sockets;
   (d) a wiring means having a predetermined amperage rating and connected at one end to said ballast means; and
   (e) a receptacle means connected to a second end of said wiring means and connected to said power source.

* * * * *